Patented Apr. 19, 1932

1,854,385

UNITED STATES PATENT OFFICE

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION

PROCESS OF DRYING ORGANIC LIQUIDS

No Drawing.     Application filed October 27, 1928.     Serial No. 315,585.

This invention relates to means of extracting water from its solution in other substances and especially to the removal of water from other liquids. In the drying of a water-wet organic liquid there is used a medium of great solvent power for water but of limited solvent power for or solubility in said organic liquid.

My invention may be illustrated by the following examples. In these examples and elsewhere in the specifications and claims all proportions are expressed as parts by weight.

Example 1

One hundred and thirty parts of ethylene glycol are shaken with a saturated solution of water in 90 parts of diethyl acetal and 10 of denatured ethyl alcohol. The mixture is then allowed to stand until a lower layer forms. The lower layer is then separated and the upper, partially dried layer comprising diethyl acetal and alcohol, is extracted with additional glycol.

Example 2

Two hundred parts of a mixture of the approximate composition butyl acetate 76%, butanol 21%, and water 3% are mixed, by agitation, with 100 parts of glycerine. The mixture is then allowed to stand and separate into two layers. The lower layer is drawn off, and the upper is again extracted with an additional 100 parts of glycerin. Again the lower layer is separated. The upper layer now comprises butyl acetate and butanol with a much smaller percentage of water than was present originally.

Example 3

A mixture of butyl acetate, butanol, and water that has been extracted with glycerine, as in Example 2, is submitted to fractional distillation. The small amount of water that was not removed by the glycerine extraction appears in a wet fraction or foreshot. Vapor distilling above 100° C. is dry. At the end of the fractionation there is left in the still a small amount of glycerine. This recovered glycerine as well as the wet foreshot may be returned to the next lot of butyl acetate, butanol, and water that is to be dried.

Example 4

Two hundred and fifty parts of a mixture containing ethyl acetate 80%, ethanol 12%, and water approximately 8%, is extracted, at 24° C., with 5 successive portions of 32 parts each of glycerine (sp. gr. 1.253). The lower layer formed in each extraction is drawn off. After the fifth extraction, the ethyl acetate mixture, contained in the upper layer, is fractionally distilled. When one third of the ethyl acetate layer has been thus distilled, further distillation gives a condensate that withstands more than 6 times its volume of naphtha without forming a cloud of precipitated water.

The glycerine which remains, in small amount, in the still at the conclusion of the distillation and also the wet foreshot, or first fraction of the distillate, are returned to a lot of wet ethyl acetate mixture that is to be dried subsequently.

The main portion of the glycerin that was used occurs in the several lower layers separated during the extraction of the ethyl acetate mixture. These lower layers may be combined and fractionated to expel vapors of ethyl alcohol and ethyl acetate (which are dissolved to some extent in the glycerin extracts). The vapors may be condensed to give a wet ethyl acetate mixture suitable for mixing with additional wet ethyl acetate mixture that is to be dried by glycerin extraction, as illustrated above. After the recovery of alcohol and ethyl acetate from the glycerin, as described, the wet glycerin may then be heated to approximately 140° C., suitably with a stream of air being passed through, to remove most of the dissolved water and thus concentrate the glycerine for reuse in drying a fresh quantity of the wet alcohol and ethyl acetate mixture.

The above examples are intended to serve as illustrations of only some of the procedures that may be followed in practicing my invention. Many variations may be made from these details without departing from the spirit of the invention.

The used ethylene glycol, for example, may be concentrated for reuse, as drying agent, by a heating process similar to that described for glycerin.

The temperatures of extraction, the number of separate extractions, and/or the proportion of each lot of extraction liquid to the liquid to be extracted may be varied within limits. Such variations affect the amount of wet foreshot that must be fractionated to remove the last of the water from the extracted liquid. Thus, in one run, I have completed the drying of extracted ethyl acetate, of the original composition used in Example 4, by fractionally distilling only 18% of the extracted ethyl acetate layer.

As a substitute for ethylene glycol or glycerin as the extracting agent, there may be used some other liquid that has a high solvent power for water, preferably complete miscibility, but only a limited solubility in or for the liquid from which the water is to be extracted.

The means of obtaining contact of the extracting liquid and the composition to be extracted may be varied from the agitation used in the illustrative examples. Thus, for example, I may introduce wet ethyl acetate into the bottom of a column of glycerine, said ethyl acetate entering through a horizontally placed porous member which divides the stream of ethyl acetate into droplets which rise through the glycerine.

I claim—

1. The process of drying an aqueous ethyl acetate solution which comprises passing said solution, in the form of droplets, through glycerin.

2. In removing water from its solution in an organic liquid, the step which comprises treating the solution at a temperature substantially below its boiling point with a liquid that is completely miscible with water but has only a limited solubility in and solvent power for the said organic liquid.

3. In removing water from a solution containing water and a liquid ester, the step which comprises extracting said solution with a liquid that is completely miscible with water but has only a limited solubility in and solvent power for the ester.

4. In removing water from a solution containing water and a liquid ester, the step which comprises extracting said solution with a liquid polyhydric alcohol.

5. In removing water from a solution containing water and a liquid ester, the step which comprises extracting said solution with glycerin.

6. The process of removing water from its solution in ethyl acetate which comprises mixing the water-ethyl acetate solution with glycerin.

7. The process of removing water from its solution in ethyl acetate which comprises mixing the water-ethyl acetate solution with glycerine and allowing the mixture to separate into two layers.

8. The process of removing water from its solution in ethyl acetate which comprises mixing the water-ethyl acetate solution with glycerine, allowing the mixture to separate into two layers, and then removing the lower layer to another container.

9. The process of removing water from its solution in ethyl acetate which comprises mixing the water-ethyl acetate solution with glycerin, allowing the mixture to separate into two layers, drawing off the lower layer, and then fractionating the upper layer.

10. The process of removing water from its solution in ethyl acetate which comprises mixing the water-ethyl acetate solution with glycerin, allowing the mixture to separate into two layers, drawing off the lower layer, and then fractionating the upper layer, the wet portion of the distillate being collected in a separate receiver from the later, dry portion of the distillate.

11. The process of removing water from its solution in a mixture of ethyl acetate and ethyl alcohol, containing not substantially less than 80 parts of ethyl acetate to 12 of alcohol, which comprises mixing the solution with a liquid polyhydric alcohol.

12. The process of removing water from its solution in a mixture of ethyl acetate and ethyl alcohol, containing not substantially less than 80 parts of ethyl acetate to 12 of alcohol, which comprises mixing the solution with glycerin.

13. The process of removing water from its solution in a mixture of ethyl acetate and ethyl alcohol, containing not substantially less than 80 parts of ethyl acetate to 12 of alcohol, which comprises mixing the solution with glycerine, allowing the mixture to separate into two layers, drawing off the lower layer, and then fractionating the upper layer.

14. The extraction of water from a mixture comprising ethyl acetate, water, and alcohol, containing not substantially less than 80 parts of ethyl acetate to 12 of alcohol, by treatment with more than one portion glycerin and drawing off a lower, glycerin-containing layer after each treatment.

15. The extraction of water from a mixture comprising ethyl acetate, water, and alcohol, by mixing with at least 10 parts of glycerin for each 100 of said mixture.

R. H. VAN SCHAACK, Jr.